United States Patent
Vollmer et al.

(10) Patent No.: US 8,786,226 B2
(45) Date of Patent: Jul. 22, 2014

(54) METHOD FOR OPERATING A DRIVE UNIT, AND A DRIVE UNIT

(75) Inventors: Ulrich Vollmer, Weilheim (DE); Ekkehard Hoffmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 13/500,003

(22) PCT Filed: Aug. 10, 2010

(86) PCT No.: PCT/EP2010/061603
§ 371 (c)(1),
(2), (4) Date: Jun. 22, 2012

(87) PCT Pub. No.: WO2011/042237
PCT Pub. Date: Apr. 14, 2011

(65) Prior Publication Data
US 2012/0262098 A1    Oct. 18, 2012

(30) Foreign Application Priority Data
Oct. 6, 2009    (DE) .......................... 10 2009 045 351

(51) Int. Cl.
*H02P 1/04*    (2006.01)
(52) U.S. Cl.
USPC ................. 318/400.09; 318/400.02; 318/432; 318/461
(58) Field of Classification Search
USPC ............... 318/400.02, 400.09, 432, 461, 490, 318/563; 361/31; 180/405, 414
See application file for complete search history.

(56) References Cited

U.S. PATENT DOCUMENTS

| | | | | |
|---|---|---|---|---|
| 4,687,214 | A * | 8/1987 | Uno | 180/414 |
| 5,491,622 | A * | 2/1996 | Carosa | 363/56.02 |
| 6,041,884 | A * | 3/2000 | Shimizu et al. | 180/443 |
| 6,283,243 | B1 * | 9/2001 | Bohner et al. | 180/406 |
| 6,612,393 | B2 * | 9/2003 | Bohner et al. | 180/405 |
| 6,683,435 | B1 * | 1/2004 | Liang et al. | 318/727 |
| 7,474,070 | B2 * | 1/2009 | Miyazawa et al. | 318/432 |
| 7,782,000 | B2 * | 8/2010 | Suzuki | 318/434 |
| 7,813,089 | B2 * | 10/2010 | Suzuki | 361/31 |
| 7,813,626 | B2 * | 10/2010 | Suzuki | 388/812 |
| 7,859,206 | B2 * | 12/2010 | Suzuki | 318/400.02 |
| 7,880,417 | B2 * | 2/2011 | Suzuki | 318/432 |
| 7,990,094 | B2 * | 8/2011 | Tamaizumi | 318/461 |
| 8,027,766 | B2 * | 9/2011 | Nozawa et al. | 701/41 |

(Continued)

FOREIGN PATENT DOCUMENTS

| | | |
|---|---|---|
| DE | 198 49 889 | 5/2000 |
| JP | 2004-018254 | 1/2004 |

(Continued)

OTHER PUBLICATIONS

International Search Report for PCT/EP2010/061603, dated Oct. 19, 2010.

*Primary Examiner* — Paul Ip
(74) *Attorney, Agent, or Firm* — Kenyon & Kenyon LLP

(57) ABSTRACT

In a method for operating a drive unit having an electric machine, in a normal operating mode the electric machine is operated with current provided by an inverter on at least two phases, and particular phase voltages for the electric machine are set on the phases. Upon an occurrence of an error of the inverter, the inverter is operated in an emergency operating mode for the further operation of the electric machine.

10 Claims, 1 Drawing Sheet

(56) References Cited

U.S. PATENT DOCUMENTS

| | | | |
|---|---|---|---|
| 8,040,096 B2* | 10/2011 | Taniguchi | 318/490 |
| 8,116,945 B2* | 2/2012 | Nozawa | 701/41 |
| 8,160,777 B2* | 4/2012 | Tamaizumi | 701/42 |
| 2004/0264075 A1* | 12/2004 | Kolomeitsev | 361/23 |
| 2007/0205734 A1* | 9/2007 | Miyazawa et al. | 318/432 |
| 2008/0185983 A1* | 8/2008 | Suzuki | 318/449 |
| 2008/0203963 A1* | 8/2008 | Suzuki | 318/799 |
| 2008/0290829 A1* | 11/2008 | Suzuki | 318/563 |
| 2008/0297958 A1* | 12/2008 | Suzuki | 361/31 |
| 2008/0309270 A1* | 12/2008 | Suzuki | 318/432 |
| 2008/0315809 A1* | 12/2008 | Tamaizumi | 318/400.23 |
| 2009/0096394 A1* | 4/2009 | Taniguchi | 318/400.09 |
| 2009/0132126 A1* | 5/2009 | Tamaizumi | 701/42 |
| 2009/0187312 A1* | 7/2009 | Nozawa et al. | 701/42 |
| 2009/0192665 A1* | 7/2009 | Nozawa | 701/29 |

FOREIGN PATENT DOCUMENTS

| | | |
|---|---|---|
| JP | 2005-094873 | 4/2005 |
| JP | 2009-071975 | 4/2009 |
| WO | WO 98/10971 | 3/1998 |

* cited by examiner

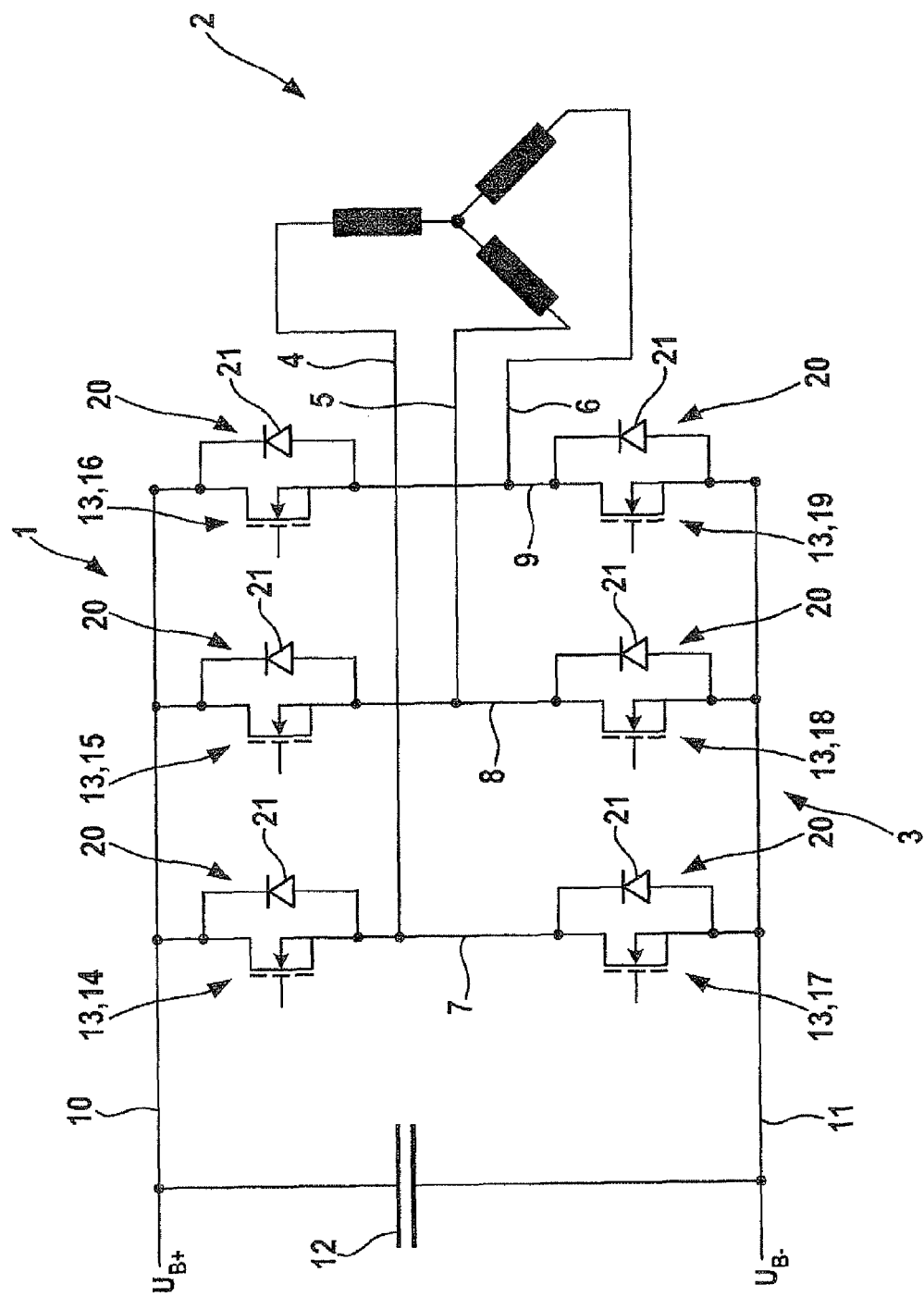

METHOD FOR OPERATING A DRIVE UNIT, AND A DRIVE UNIT

BACKGROUND OF THE INVENTION

1. Field of the Invention

The present invention relates to a method for operating a drive unit, the drive unit having an electric machine that, in normal operation, is operated with a current provided by an inverter on at least two phases, particular phase voltages for the electric machine being set on the phases.

2. Description of Related Art

Methods of the type named above are known from the existing art. In these, the electric machine is supplied by the inverter with current present on the at least two phases. In order to set the rotational speed and torque of the electric machine, the phase voltages are set that are adjacent to the phases. However, if during normal operation of the electric machine an error occurs, in particular an error of the inverter, frequently a separating device (for example a phase separation relay, which may be electronic or electromechanical) is used to completely separate the electric machine from the inverter. In this way, the electric machine is prevented from producing a torque in an undesired direction when the error of the inverter occurs. In this regard, reference is made to published international patent application document WO 98/10971 A1. The drive unit here standardly has a device with which the occurrence of the error of the inverter can be determined. Such devices are also known from the existing art. As a general reference concerning the existing art, reference is made to published German patent application document DE 198 49 889 A1. This patent specification describes a method for regulating synchronous machines, optimized for power and efficiency. At least three regulating ranges are formed in which the regulation of an excitation current and of phase currents of an electric machine fashioned as a generator takes place according to various criteria. In this way, the available output power and the efficiency of the generator can be increased in comparison with a generator having passive diode rectification. In normal operation of the generator, the regulating ranges are selected as a function of existing requirements and boundary conditions, such as the desired output power and the existing generator rotational speed.

BRIEF SUMMARY OF THE INVENTION

In comparison with the existing art, the method for operating a drive unit according to the present invention has the advantage that the electric machine can be further operated, at least to a limited extent, even given the occurrence of an error of the inverter. According to the present invention, this is achieved in that after the occurrence of an error of the inverter the inverter is operated in an emergency operating mode for the further operation of the electric machine. Here it is provided in particular that even in emergency operation the electric machine continues to be electrically connected to the inverter. Thus, it is not provided to electrically decouple the electric machine from the inverter, for example using a phase separation relay, in order in this way to prevent the electric machine from producing an undesired torque (for example a braking torque). Rather, it is provided that even in emergency operating mode the electric machine produces, at least partly, a requested torque. It can be provided that after the occurrence of the error, or a sensing of the error, an emergency operating mode is selected from a plurality of available emergency operating modes, as a function of the occurrent error.

The inverter operable in emergency operating mode thus makes it possible to do without the phase separation relay. In this way, the constructive space required for the drive unit, its power loss, and its costs are reduced. If the drive unit is used in a motor vehicle, the method according to the present invention can achieve an emergency operation, i.e. a torque can still be produced even when an error occurs. Thus, a "limp home" function can be realized, for example in the context of an electric power steering system, or given a hybrid or electric drive of the motor vehicle equipped with the drive unit. The electric machine can for example be a synchronous machine.

A development of the present invention provides that each phase has allocated to it at least two switches, in particular a high-side switch and a low-side switch. The inverter used to control the electric machine can for example be realized on the basis of semiconductor switches (MOSFET, IGBT). If an error occurs in such a semiconductor switch, the electric machine can no longer be controlled correctly, so that the inverter has to operate in emergency operating mode in order to ensure, at least to a limited extent, further functioning of the electric machine. The switches of the inverter allocated to the phases are controlled in order to set the particular phase voltages. For this purpose, the switches are used for example for pulse-width modulation. This means that the switches are correspondingly opened or closed in order to achieve the desired phase voltages for the electric machine. If two switches are provided, one of the switches is standardly used as the high-side switch and a further switch is used as the low-side switch. Here, the high-side switch is situated between a potential and the electric machine, and the low-side switch is situated between the electric machine and ground. Each of the switches can have allocated to it a freewheeling path, in particular having a freewheeling diode. The error of the inverter can for example be that one of the switches no longer functions correctly, i.e. is permanently closed or permanently open. In both cases, the emergency operation of the inverter must be carried out in order to avoid faulty behavior of the electric machine.

A development of the present invention provides that in normal operation a transformation of rotor-fixed manipulated variables to stator-fixed manipulated variables is carried out, the stator-fixed manipulated variables including the phase voltages, and/or a limitation of the manipulated variables to a maximum magnitude being carried out. The manipulated variables can for example be current strengths or voltages. In order to determine the rotor-fixed manipulated variables, for example a field-oriented regulation is used that is known from the existing art. After the determination of the rotor-fixed manipulated variables, these are transformed to stator-fixed manipulated variables in order to make it possible to use the inverter to control the electric machine of the drive unit. For this purpose, for example the inverse Park transformation is used, carried out using the equation $$\begin{pmatrix} U_a \\ U_b \\ U_c \end{pmatrix} = \begin{bmatrix} \cos(\varphi) & -\sin(\varphi) \\ \cos(\varphi - 120°) & -\sin(\varphi - 120°) \\ \cos(\varphi + 120°) & -\sin(\varphi + 120°) \end{bmatrix} \begin{pmatrix} U_d \\ U_q \end{pmatrix}$$

Here $U_d$ and $U_q$ are the rotor-fixed manipulated variables, $U_a$, $U_b$, and $U_c$ are the stator-fixed manipulated variables, and $\varphi$ is the rotor angle relative to the stator. The angle 120° results from a three-phase design of the electric machine in which stator windings are offset relative to one another by this angle. In addition, a limitation of the manipulated variables to the maximum magnitude can be carried out. Preferably, for this purpose the rotor-fixed manipulated variables are used before they are transformed into stator-fixed manipulated variables. Here, the relation $$U_d^2 + U_q^2 \leq U_B^2/3$$

is to be observed. The maximum magnitude of the manipulated variables is standardly specified by an on-board electrical system of the motor vehicle (having operating voltage $U_B$).

A development of the present invention provides that in the emergency operating mode the electric machine produces a torque. The torque should correspond at least in its prefixed sign to a requested torque. Thus, if a positive torque (drive moment) is requested, it should at least be ensured that the electric machine does not produce a negative torque (braking moment).

A development of the present invention provides that if the error relates to a faulty switch, a first emergency operating mode is selected. As already presented above, such a faulty switch can either be permanently closed or permanently open. In this case, from a plurality of available emergency operating modes the first emergency operating mode is selected.

In a development of the present invention, it is provided that in the first emergency operating mode a further switch, allocated to the same phase as the faulty switch, is opened or closed. This means in particular that in the case of a defective high-side switch, the corresponding low-side switch of the same phase is opened, or closed, and vice versa. Preferably, however, it is provided that if one of the switches is permanently conductive, the respective other switch is opened. If, in contrast, the switch is permanently open, i.e. not conductive, the respective other switch can be closed or opened. In the latter case, in the phase in which the faulty switch is situated current continues to flow only via the possibly present freewheeling path of the respectively other, i.e. intact, switch. The switch in the bridge should therefore be wired such that it is not the case that both switches are simultaneously closed, or conductive, in order to avoid a short-circuit in the phase.

A development of the present invention provides that in the first emergency operating mode the transformation is carried out taking into account the faulty switch. If, for example, the high-side switch of a phase is permanently conductive (so that the phase voltage of this phase is equal to $U_B$), then this is taken into account in the transformation from the rotor-fixed manipulated variables to the stator-fixed manipulated variables. If the phase having phase voltage $U_C$ is concerned, then for the two remaining branches the stator-fixed manipulated variables $U_a$ and $U_b$ result from the equation:

$$\begin{pmatrix} U_a \\ U_b \end{pmatrix} = \sqrt{3} \begin{bmatrix} -\sin(\varphi - 120°) & -\cos(\varphi - 120°) \\ \sin(\varphi) & \cos(\varphi) \end{bmatrix} \begin{pmatrix} U_d - \frac{2}{3} U_c \cos(\varphi + 120°) \\ U_q + \frac{2}{3} U_c \sin(\varphi + 120°) \end{pmatrix}$$

where $U_c = U_B$. Thus, in the first emergency operating mode the determination of the rotor-fixed manipulated variables can be carried out analogously to the determination made in normal operation. The error of the inverter must be taken into account only in the transformation of the rotor-fixed manipulated variables into the stator-fixed manipulated variables.

A development of the present invention provides that if the error relates to a short-circuit between two phases, a second emergency operating mode is selected. As soon as it is determined that the short-circuit is present, the inverter is operated in emergency operating mode. For this purpose, the second emergency operating mode is selected.

A development of the present invention provides that in the second emergency operating mode only one of the rotor-fixed manipulated variables, in particular a manipulated variable that forms torque, is set. When there is a short-circuit between two phases, in a three-phase electric machine—which has three phases available—only one of the rotor-fixed manipulated variables is still available. Only this variable can be set or regulated for the operation of the electric machine. In the second emergency operating mode, a changeover thus takes place to a regulation of the electric machine or of the inverter in which preferably only the torque-forming manipulated variable is set. Consequently, a field-forming manipulated variable cannot be influenced.

A development of the present invention provides that in the second emergency operating mode, instead of the torque-forming manipulated variable, a field-forming manipulated variable is set at least temporarily, as soon as this variable reaches a maximum value. Because in the second emergency operating mode only the torque-forming manipulated variable is set, the field-forming manipulated variable cannot be directly influenced. Rather, this variable is set on the basis of the torque-forming manipulated variable. Standardly, however, the field-forming manipulated variable must not exceed a specified maximum value. The value of the field-forming manipulated variable must accordingly be monitored. If it reaches the maximum value, then at least temporarily a changeover can take place to the regulation of the field-forming manipulated variable. This means that now it is no longer the torque-forming, but rather the field-forming manipulated variable that is set for controlling or regulation. The goal of the setting can for example be to bring the field-forming manipulated variable to a value of zero. If the field-forming manipulated variable has reached a sufficiently small value, a changeover can then take place back to the setting of the torque-forming manipulated variable.

The present invention also relates to a drive unit, in particular for implementing the above-described method, having an electric machine that in a normal operating mode is capable of being operated with a current provided by an inverter on at least two phases, particular phase voltages for the electric machine being set on the phases. It is provided that, for the further operation of the electric machine after the occurrence of an error of the inverter, the inverter is capable of being operated in an emergency operating mode. Thus, as known from the existing art, when an error of the inverter occurs the electric machine does not have to be electrically separated from the inverter in order to avoid disadvantageous behavior of the electric machine. It is in particular provided that the electric machine at least partly produces the required torque.

A development of the present invention provides that the electric machine is an electric motor, in particular a permanently excited synchronous machine. The electric machine is here a component of the drive unit, which is made up essentially of the electric machine and the inverter, as well as the electronics required for the controlling thereof.

A development of the present invention provides that the drive unit is provided for use in a power steering system or motor vehicle drive. The power steering system is an electrically assisted power steering system, the drive unit producing the torque required for the steering of a motor vehicle. The motor vehicle drive can be for example purely electric or can be realized as a hybrid drive. In the first case, the drive unit alone is used to drive the motor vehicle. In the case of the hybrid drive, the drive unit is combined with a further torque-producing machine, e.g. an internal combustion engine.

BRIEF DESCRIPTION OF THE DRAWINGS

FIGURE shows a drive unit having an electric machine and an inverter.

DETAILED DESCRIPTION OF THE INVENTION

The FIGURE shows a drive unit 1 having an electric machine 2 and an inverter 3. Drive unit 1 is for example used as part of an electric power steering system or in order to drive a motor vehicle. Electric machine 2 is for example a three-phase permanently excited synchronous machine, thus having three phases 4, 5, 6 via which it is supplied with current by inverter 3. Phases 4, 5, 6 are connected to external conductors 7, 8, and 9 of inverter 3. Inverter 3 itself is connected to a current source 12, which is a direct current source, via connecting lines 10 and 11.

Each of phases 4, 5, 6 has allocated to it respectively two switches 13, high-side switches 14, 15, and 16 being connected to connecting line 10, and low-side switches 17, 18, and 19 being connected to connecting line 11. Phase 4 has high-side switch 14 and low-side switch 17, phase 5 has high-side switch 15 and low-side switch 18, and phase 6 has high-side switch 16 and low-side switch 19. A freewheeling path 20 is allocated to, or connected in parallel to, each of the switches 13. Each freewheeling path 20 has a freewheeling diode 21.

In a normal operating mode of electric machine 2, or of drive unit 1, switches 13 are controlled by pulse-width modulation in order to provide electric machine 2 with phase voltages via phases 4, 5, 6, so that the machine produces a torque. For this purpose, a regulation, or current regulation, is used, for example a field-oriented regulation. Using this regulation, rotor-fixed manipulated variables $U_d$ and $U_q$ are determined, which correspond for example to a torque or to a rotational speed of electric machine 2. These rotor-fixed manipulated variables $U_d$ and $U_q$ are transformed to stator-fixed manipulated variables $U_a$, $U_b$, and $U_c$, using an inverse Park transformation according to the equation $$\begin{pmatrix} U_a \\ U_b \\ U_c \end{pmatrix} = \begin{bmatrix} \cos(\varphi) & -\sin(\varphi) \\ \cos(\varphi - 120°) & -\sin(\varphi - 120°) \\ \cos(\varphi + 120°) & -\sin(\varphi + 120°) \end{bmatrix} \begin{pmatrix} U_d \\ U_q \end{pmatrix}$$

The stator-fixed manipulated variables $U_a$, $U_b$, and $U_c$ resulting from this equation are now set on phases 4 ($U_a$), 5 ($U_b$), and 6 ($U_c$), using pulse-width modulation and switches 13. Beforehand, a limitation of the manipulated variables to a maximum magnitude $U_{max}$ can also be carried out. $U_{max}$ standardly corresponds to a voltage $U_B$ that can be provided by the on-board electrical system of a motor vehicle. This means that the magnitude of the manipulated variables must be determined to be less than or equal to the maximum magnitude according to the equation $$U_d^2 + U_q^2 \leq U_B^2/3.$$

If an error of inverter 3 is present, inverter 3 is operated in an emergency operating mode for the further operation of electric machine 2. This means that electric machine 2 continues to be electrically connected to inverter 3 via phases 4, 5, 6; i.e. a separation of this connection, as known in the existing art, is not carried out. For the recognition of the error, drive unit 1 has suitable equipment not shown here. The error of inverter 3 can for example be that one of switches 13 is permanently conductive, i.e. permanently closed, or permanently non-conductive, i.e. permanently open. In this case, from a plurality of available emergency operating modes a first emergency operating mode is selected.

In this mode, first that switch 13 is opened or closed that is situated in the same phase 4, 5, or 6 as the faulty switch 13. If for example high-side switch 16 is permanently conductive, low-side switch 19 is opened. If on the other hand high-side switch 16 is permanently non-conductive, low-side switch 19 can either be opened or closed. Here care is to be taken that high-side switch 14, 15, or 16 and low-side switch 17, 18, or 19 of a phase 4, 5, or 6 are not simultaneously closed. In that case, there would be a short-circuit between connecting lines 10 and 11, via the respective phase 4, 5, or 6.

If high-side switch 16 is permanently conductive, phase 6 is permanently in electrical connection with a connecting line 10, so that a supply voltage $U_B$ is present at phase 6, and $U_c = U_B$. In the first emergency operating mode, in addition the rotor-fixed manipulated variables are determined using suitable regulation and are subsequently converted into the stator-fixed manipulated variables. Here, however, the closed high-side switch 16, i.e. $U_c = U_B$, is to be taken into account. For this example, the equation of the inverse Park transformation results as:

$$\begin{pmatrix} U_a \\ U_b \end{pmatrix} = \sqrt{3} \begin{bmatrix} -\sin(\varphi - 120°) & -\cos(\varphi - 120°) \\ \sin(\varphi) & \cos(\varphi) \end{bmatrix} \begin{pmatrix} U_d - \frac{2}{3} U_c \cos(\varphi + 120°) \\ U_q + \frac{2}{3} U_c \sin(\varphi + 120°) \end{pmatrix}$$

Stator-fixed manipulated variables $U_a$, $U_b$, and $U_c = U_B$ are subsequently set on phases 4, 5, 6 of electric machine 2 via pulse-width modulation of switches 13, so that in the emergency operating mode this machine can continue to produce a torque that corresponds at least partly to the desired or requested torque.

If, in contrast, high-side switch 16 is permanently non-conductive, low-side switch 19 is likewise permanently closed, and the above-described method is carried out. Alternatively, low-side switch 19 can also be opened. Thus, in external conductor 9, when the emergency operating mode of electric machine 2 is carried out current flows only via freewheeling path 20 of low-side switch 19.

If, in contrast, there is a short-circuit between two of the phases 4, 5, 6, a second emergency operating mode is selected from the available emergency operating modes. In the case of such an error, only one of the rotor-fixed manipulated variables $U_d$ and $U_q$ (or $I_d$ and $I_q$) can be set. Here, $I_q$ is a torque-forming manipulated variable, and $I_d$ is a field-forming manipulated variable. In the second emergency operating mode, only $I_q$ is set, or regulated/controlled. Field-forming manipulated variable $I_d$ is set automatically on the basis of torque-forming manipulated variable $I_q$. Subsequently, the above-described transformation from the rotor-fixed manipulated variables to the stator-fixed manipulated variables is again carried out, and these are set on phases 4, 5, 6 of electric machine 2.

Here, however, standardly the field-forming manipulated variable $I_d$ must not exceed a particular maximum value. If field-forming manipulated variable $I_d$ comes into the region of this maximum value, then for example a changeover can take place to a regulation in particular of torque-forming manipulated variable $I_q$, regulating this variable back to zero.

If field-forming manipulated variable $I_d$ is sufficiently small, a changeover can then again take place to the setting of torque-forming manipulated variable $I_q$.

In the implementation of the described method, a separate regulating device for the electric machine or for the inverter can be allocated to each emergency operating mode, and when the error occurs a changeover between these regulating devices can take place. The function can however also be realized by a single regulating device.

What is claimed is:

1. A method for operating a drive unit having an electric machine, comprising:

operating the electric machine in a normal operating mode with current supplied by an inverter on at least two phases, wherein selected phase voltages for the electric machine are set on the at least two phases, wherein at least two switches including a high-side switch and a low-side switch are allocated to each phase; and wherein in the normal operating mode, a transformation is carried out from rotor-fixed manipulated variables to stator-fixed manipulated variables, and wherein at least one of (i) the stator-fixed manipulated variables include the phase voltages, and (ii) the manipulated variables are limited to a predefined maximum magnitude; and wherein after an occurrence of an error of the inverter, operating the inverter in at least one emergency operating mode for further operation of the electric machine;

wherein if the error of the inverter relates to a short-circuit between two phases, a second emergency operating mode is implemented.

2. The method as recited in claim 1, wherein in the at least one emergency operating mode the electric machine produces a torque.

3. The method as recited in claim 1, wherein if the error of the inverter relates to a faulty switch, a first emergency operating mode is implemented.

4. The method as recited in claim 3, wherein in the first emergency operating mode a further switch allocated to the phase associated with the faulty switch is one of opened or closed.

5. The method as recited in claim 3, wherein in the first emergency operating mode the transformation is carried out taking into account the faulty switch.

6. The method as recited in claim 1, wherein in the second emergency operating mode, only one of the rotor-fixed manipulated variables in the form of a torque-forming manipulated variable is set.

7. The method as recited in claim 1, wherein in the second emergency operating mode, only one of the rotor-fixed manipulated variables in the form of a field-forming manipulated variable is set at least temporarily as soon as the field-forming manipulated variable reaches a maximum value.

8. A drive unit, comprising:

an inverter; and an electric machine;

wherein, in a normal operating mode, the electric machine is operated with current provided by the inverter on at least two phases, wherein selected phase voltages for the electric machine are set on the at least two phases, wherein at least two switches including a high-side switch and a low-side switch are allocated to each phase; and wherein in the normal operating mode, a transformation is carried out from rotor-fixed manipulated variables to stator-fixed manipulated variables, and wherein at least one of (i) the stator-fixed manipulated variables include the phase voltages, and (ii) the manipulated variables are limited to a predefined maximum magnitude; and; and wherein after an occurrence of an error of the inverter, the inverter is operated in at least one emergency operating mode for further operation of the electric machine;

wherein if the error of the inverter relates to a short-circuit between two phases, a second emergency operating mode is implemented.

9. The drive unit as recited in claim 8, wherein the electric machine is an electric motor in the form of a permanently excited synchronous machine.

10. The drive unit as recited in claim 9, wherein the drive unit is provided for use in one of a power steering system or a drive system of a motor vehicle.

* * * * *